(12) United States Patent
Alexander

(10) Patent No.: US 7,566,067 B1
(45) Date of Patent: Jul. 28, 2009

(54) ADJUSTABLE TRAILER HITCH

(76) Inventor: Robert C. Alexander, 5463 State Rte. 139, Portsmouth, OH (US) 45662

( * ) Notice: Subject to any disclaimer, the term of this patent is extended or adjusted under 35 U.S.C. 154(b) by 315 days.

(21) Appl. No.: 11/473,672

(22) Filed: Jun. 23, 2006

(51) Int. Cl.
*B60D 1/07* (2006.01)
*B60D 1/42* (2006.01)

(52) U.S. Cl. .................. 280/415.1; 280/490.1; 280/511

(58) Field of Classification Search ............. 280/415.1, 280/416.1, 416.2, 490.1, 491.2, 511, 491.1, 280/494, 512, 513
See application file for complete search history.

(56) References Cited

U.S. PATENT DOCUMENTS

| | | | |
|---|---|---|---|
| 2,911,233 A | | 11/1959 | Riddle |
| 3,922,006 A | | 11/1975 | Borges |
| 4,456,279 A | | 6/1984 | Dirck |
| 4,662,647 A | * | 5/1987 | Calvert ................... 280/490.1 |
| 5,044,652 A | | 9/1991 | Brisson |
| 5,106,114 A | | 4/1992 | Haupt |
| 5,322,313 A | | 6/1994 | Schroeder |
| 5,351,982 A | * | 10/1994 | Walrath ................... 280/416.1 |
| D376,780 S | * | 12/1996 | McCoy ...................... D12/162 |
| D379,608 S | | 6/1997 | Rodriguez |
| 5,839,744 A | * | 11/1998 | Marks ...................... 280/416.1 |
| 5,857,693 A | | 1/1999 | Clark, Jr. |
| D409,124 S | | 5/1999 | Blank |
| 6,315,316 B1 | * | 11/2001 | Wyant ........................ 280/511 |
| 6,497,428 B2 | | 12/2002 | Ross |
| 6,502,845 B1 | * | 1/2003 | Van Vleet ................ 280/491.1 |
| D508,221 S | * | 8/2005 | Rebick ...................... D12/162 |
| 7,021,643 B1 | * | 4/2006 | Buchanan ................ 280/416.1 |
| 7,219,915 B2 | * | 5/2007 | Christensen ............. 280/490.1 |
| 7,347,440 B2 | * | 3/2008 | Shannon .................. 280/416.1 |

* cited by examiner

*Primary Examiner*—Lesley D Morris
*Assistant Examiner*—Marc A Scharich
(74) *Attorney, Agent, or Firm*—Robert C. Montgomery

(57) ABSTRACT

The present invention is a trailer hitch that fits in a standard 2" receiver, which allows for the selection of three different sized balls or a tow hook in an almost instantaneous manner and consists of two main components. The first is a hitch insert that fits in the standard 2" receiver hitch and is secured in the conventional manner with a hitch pin. The insert protrudes from the receiver in a generally "L"-shaped manner. The second component is a square hitch plate with a support extending from the bottom, which is secured in the lower portion of the hitch insert. The support is drilled at regular intervals to allow hitch plate to be adjusted in height to match the height of the trailer. A series of three various sized tow balls is located in each of three corners of the hitch plate, with a tow hook located in the fourth.

16 Claims, 5 Drawing Sheets

ADJUSTABLE TRAILER HITCH

RELATED APPLICATIONS

The present invention was first described in Disclosure Document No. 584,430 filed on Aug. 18, 2005.

FIELD OF THE INVENTION

The present invention relates to adjustable trailer hitches.

BACKGROUND OF THE INVENTION

Trailer hitches mounted on towing vehicles have been in use since long for towing/pulling trailers, and similar vehicles. Numerous factors including load distribution, proper hook up, weight capacities, hitch capacities, electrical light hookups, and the like, are to be considered before pulling a trailer. Once, a trailer begins to move the driver must deal with increased reaction times, lane clearances, high winds, and reduced gas mileage. The above-mentioned problems are aggravated when the driver has to deal with differently sized trailers. Connection to such trailers may require differently sized balls and hitch heights. As such, the drives may need to carry differently sized balls and different hitch bars to which the balls are attached. Additional space is required to accommodate the balls and the hitch bars; and the balls and the hitch bars have to be stores, such that, they are easily accessible. Moreover, proper wrenches are required for changing the balls. Also, changing the balls places undue stress on the couplings in the trailer hitches.

Developments have been seen in the field of trailer hitches.

U.S. Pat. No. 6,494,477 discloses an automatic trailer hitch coupling apparatus having a hitch bar receiver mounted on a platform at the rear end of a towing vehicle, the hitch bar receiver having a square cross section and a flanged rear end into which a hitch bar is removably inserted. A winch have an extendable and retractable cable is mounted on the towing vehicle proximate the receiver and a cable having a cable lead is fed outwardly from the receiver. A hitch bar for coupling within the hitch bar receiver has a front portion connected to a rear portion with a universal joint; the front portion is connected to the cable lead with a quick release and lock system. The hitch bar is integrally connected to a hitch tongue having a horizontal portion on which a hitch ball is mounted. The apparatus does not have provisions for accommodating differently sized balls for pulling differently sized trailers.

U.S. Pat. No. 5,133,572 discloses ball joint type trailer hitch which comprises a ball assembly and a ball receiving assembly comprising a body forming a ball receiving end having formed therein a generally spherical cavity truncated at the bottom thereby forming a passage for the shaft when the ball is in the cavity, a ball insertion and removal opening intersecting the cavity thereby forming a passage between the opening and the cavity for permitting the ball to be inserted into the opening and moved distally into the cavity, ball locking means supported in the passage for selective movement from an unlocked position adjacent the proximate end of the body to a locked position in engagement with the ball in the cavity, and means for selectively fixing the ball locking means in engagement with the ball. The trailer hitch does not provide efficient means for pulling differently sized trailers.

None of the prior art trailer hitches efficiently addresses the problems with regard to pulling differently sized trailers. Accordingly, what is needed is a trailer hitch system that may be adjusted in a fast, easy, convenient, and reliable manner for pulling differently sized trailers.

SUMMARY OF THE INVENTION

In view of the foregoing disadvantages inherent in the prior arts, the general purpose of the present invention is to provide an adjustable trailer hitch configured to include all the advantages of the prior arts, and to overcome the drawbacks of the prior arts.

In one aspect, the present invention provides an adjustable trailer hitch, comprising a hitch insertion assembly and a hitch plate and shank arrangement. The hitch insertion assembly has a first tubular shank adapted to be secured into a hitch receiver bracket of a towing vehicle; a boxed body having a proximal end portion and a distal end portion, the proximal end portion of the boxed body coupled to the first tubular shank; and a hitch insert receiver coupled to the distal end portion of the boxed body. The hitch plate and shank arrangement has a hitch plate capable of accommodating three differently sized ball hitches and a pulling hook; and a second tubular shank extending from the hitch plate, the second tubular shank adapted to be secured through the hitch insert receiver, such that, the hitch plate and shank arrangement is capable of being vertically and rotationally adjusted.

In another aspect, the present invention provides an adjustable hitch comprising a hitch insert and an adjustable hitch device. The hitch insert has a first tubular shank adapted to be secured into a hitch receiver bracket of a towing vehicle; a boxed body having a proximal end portion and a distal end portion, the proximal end portion of the boxed body coupled to the first tubular shank; and a hitch insert receiver coupled to the distal end portion of the boxed body. The hitch insert receiver is oriented perpendicularly to the boxed body. The adjustable hitch device has a hitch plate capable of accommodating three differently sized ball hitches and a pulling hook; and a second tubular shank extending from the hitch plate, the second tubular shank adapted to be secured through the hitch insert receiver. The second tubular shank has a plurality of adjustment holes drilled therethrough, which when aligned variably with a plurality of adjustment holes drilled through the hitch insert receiver enables a plurality of vertical adjustments for the adjustable hitch device. The second tubular shank is capable of being rotated for rotational adjustments of the adjustable hitch device.

In another aspect, the present invention provides a method for providing adjustable towing operations using an adjustable hitch having a hitch inert and a hitch plate and shank arrangement. The method comprises securing the hitch insert into a hitch receiver bracket of a towing vehicle; inserting the hitch plate and shank arrangement through a hitch insert receiver of the hitch insert, the hitch plate and shank arrangement having a hitch plate capable of accommodating three differently sized ball hitches and a pulling hook, and a second tubular shank extending from the hitch plate capable of being received through the hitch insert receiver; and adjusting the hitch plate and shank arrangement by rotating, vertically lifting, and vertically lowering the hitch plate and shank arrangement using adjustment holes drilled through the second tubular shank and adjustment holes drilled through the hitch insert receiver.

These together with other aspects of the present invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the present invention.

DESCRIPTION OF THE DRAWINGS

The advantages and features of the present invention will become better understood with reference to the following more detailed description and claims taken in conjunction with the accompanying drawings, wherein, like elements are identified with like symbols, and in which:

Figure 1:
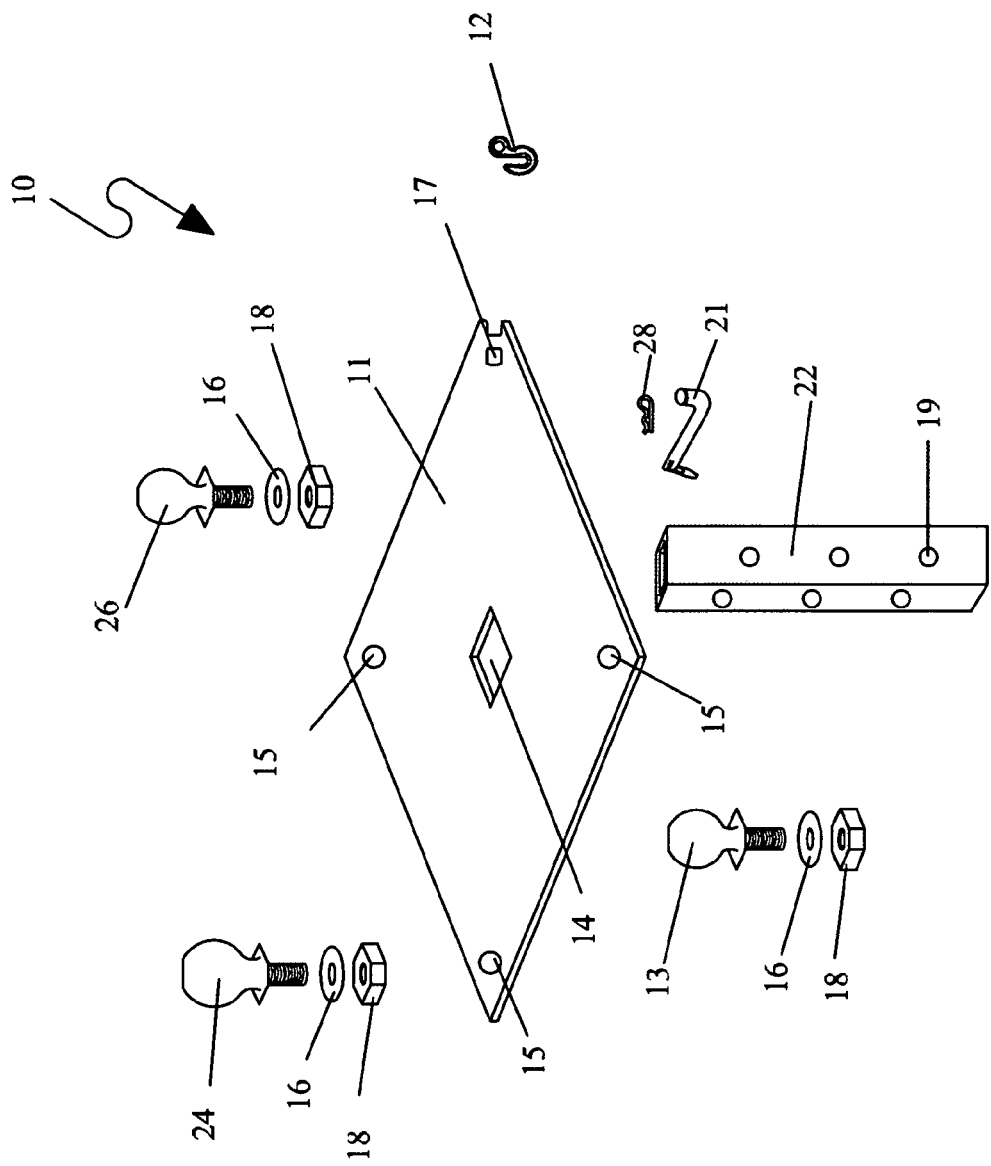
FIG. 1 is an exploded perspective view of the adjustable hitch device 10 and shank 11, according to a preferred embodiment of the present invention.

DESCRIPTIVE KEY 10 adjustable hitch device
11 hitch plate
12 hook
13 first ball hitch
14 shank insert hole
15 ball insert hole
16 lock washer
17 hook insert hole
18 nut
19 adjustment hole
20 hitch insert
21 locking pin
22 shank
23 hitch insert receiver
24 second ball hitch
25 boxed body
26 third ball hitch
27 tubular shank
28 locking pin retainer
29 stiffener
30 hitch receiver bracket
31 hitch receiver
32 locking hole
40 180 degree motion

DETAILED DESCRIPTION OF THE INVENTION

The best mode for carrying out the invention is presented in terms of its preferred embodiment, herein depicted within FIGS. 1 through 4.

The present invention describes a multi-part apparatus and method for providing adjustable pulling operations. The four-in-one adjustable hitch (herein described as the "apparatus") comprises of a hitch plate 11 and shank 22 arrangement, a hitch insertion assembly, and means to connect said assemblies to a tow vehicle system.

Referring now to FIG. 1, the apparatus takes the form of a hitch system capable of vertical and rotational adjustments as needed. The hitch plate 11 and shank 22 arrangement comprises of: a rectangular hitch plate 11 and a tubular shank 22 with adjustment holes 19 drilled therethrough the shank 22 providing rotational and vertical adjustments according to diverse trailer tongue heights; a locking pin 21 with locking pin retainer 28; a first steel ball hitch 13 of a conventional diameter, a second steel ball hitch 24 and a third steel ball hitch 26 each of different diameters tan the first steel ball hitch 13; and a pulling hook 12 inserted through a hook insert hole 17. The first 13, second 24, and third 26 steel ball hitches are mounted on the underneath or top surface of the corners of the hitch plate 11 via ball insert holes 15 in various forms of vertical orientation and secured therewith a lock washer 15 and a nut 18. Each of the first 13, second 24, and third 26 ball hitches may be interchangeably inserted therein any of the ball insert holes 15 as desired. The pulling hook 12 is mounted on the remaining corner of the hitch plate 11 in either orientation. The shank 22 is inserted through the hitch plate 11 and welded on both sides for optimal strength.

Figure 2:
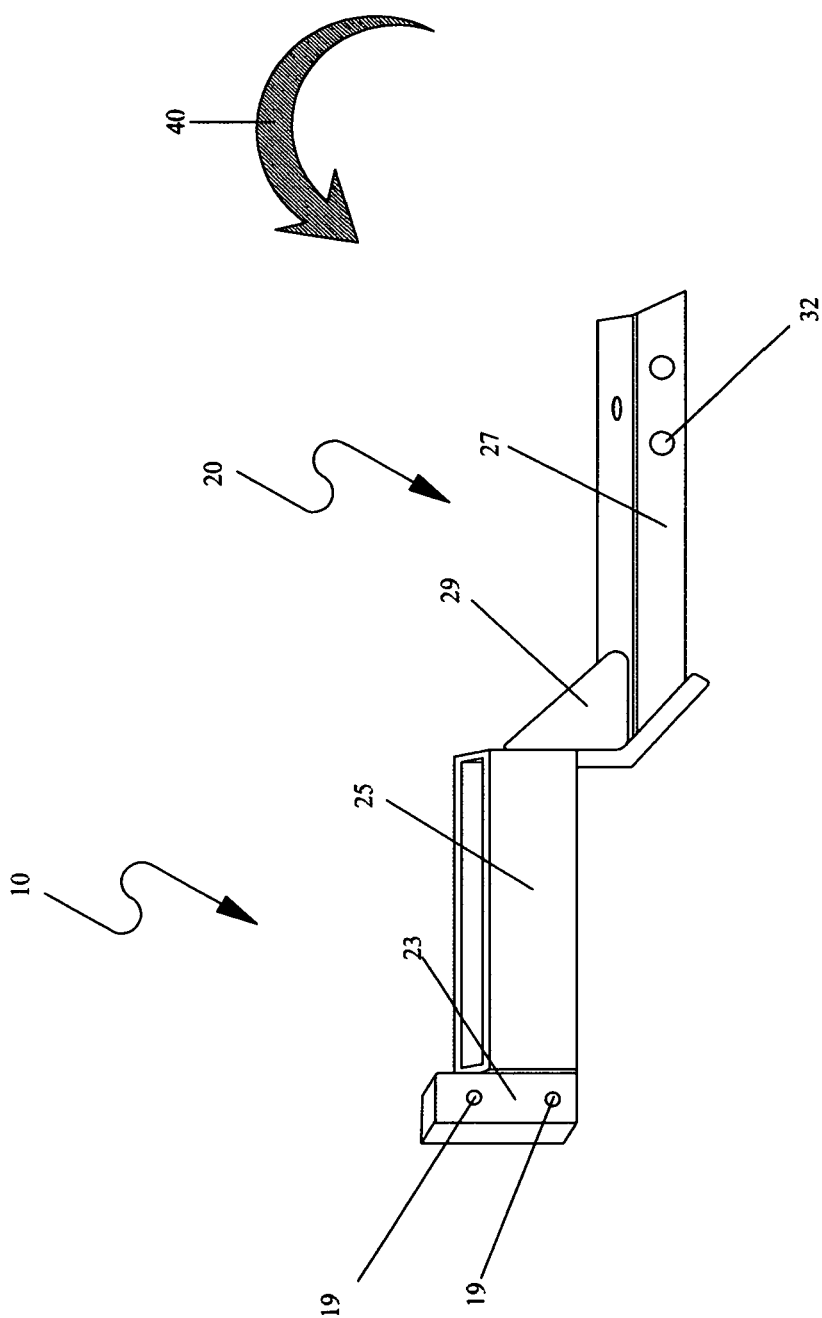
FIG. 2 is a perspective view of the hitch insert 20 in the upward position, according to a preferred embodiment of the present invention; and, FIG. 3a is a perspective view of the adjustable hitch device 10 installed within the hitch insert 20 in the upward position, according to a preferred embodiment of the present invention; and, FIG. 3b is a perspective view of the adjustable hitch device 10 installed within the hitch insert 20 in the downward position, according to a preferred embodiment of the present invention; and, FIG. 4 is a perspective view of the adjustable hitch device 10 installed within a hitch bracket 30, according to a preferred embodiment of the present invention.
Figure 3A:
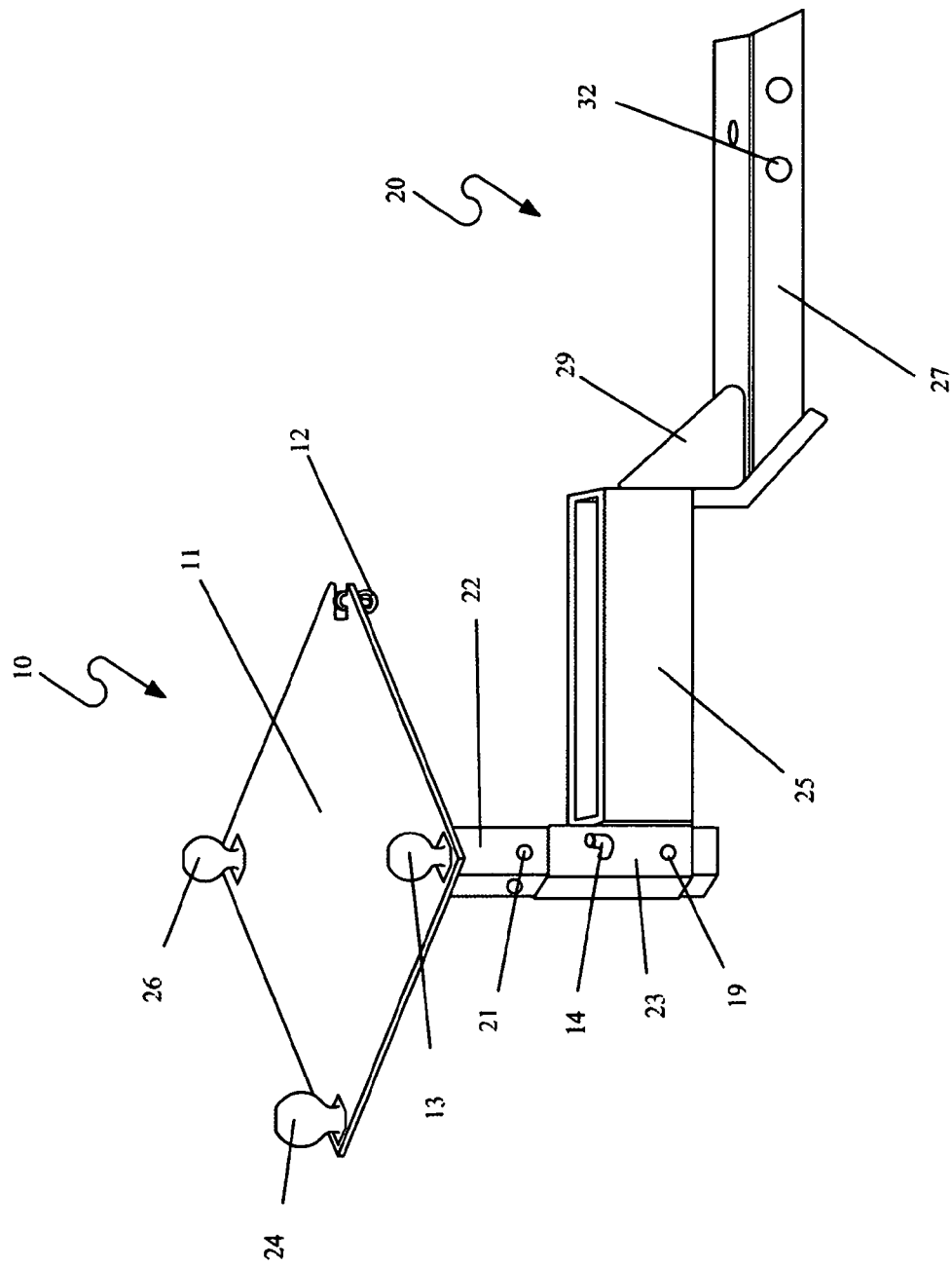
Figure 3B:
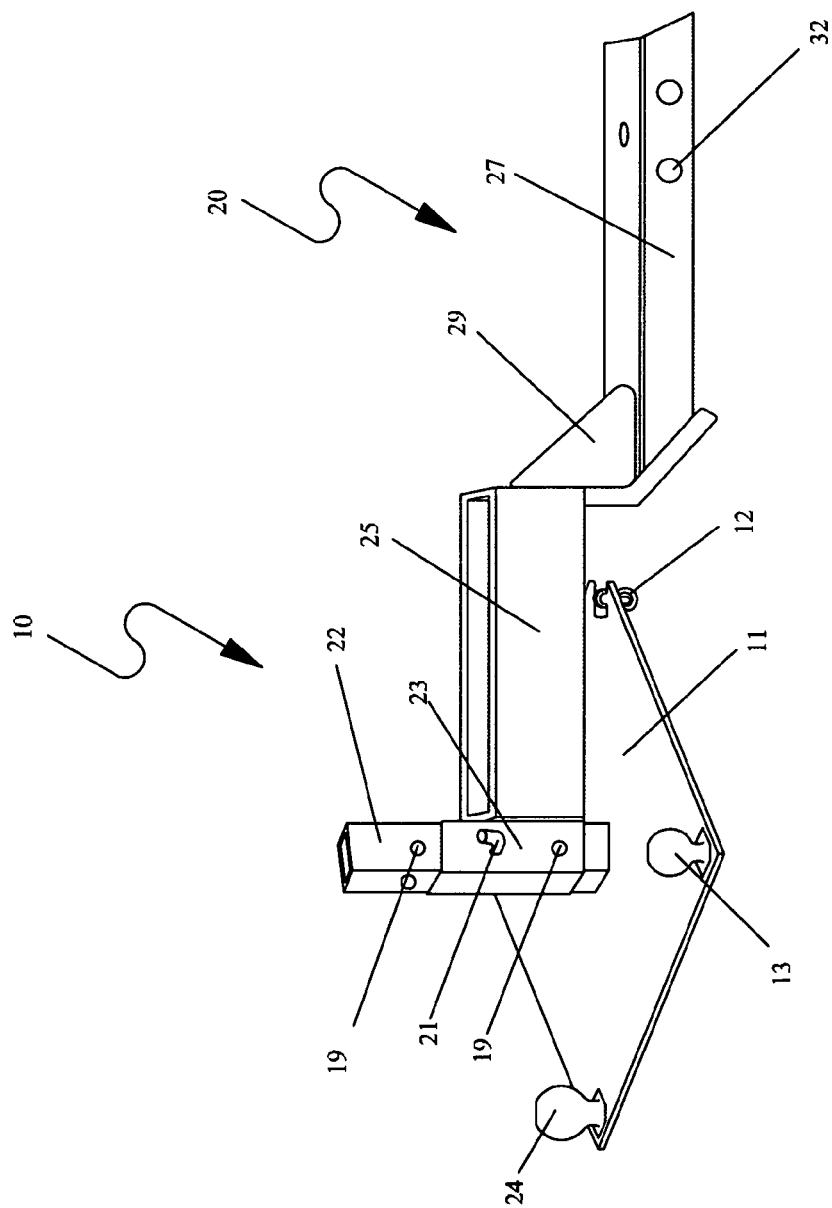
Figure 4:
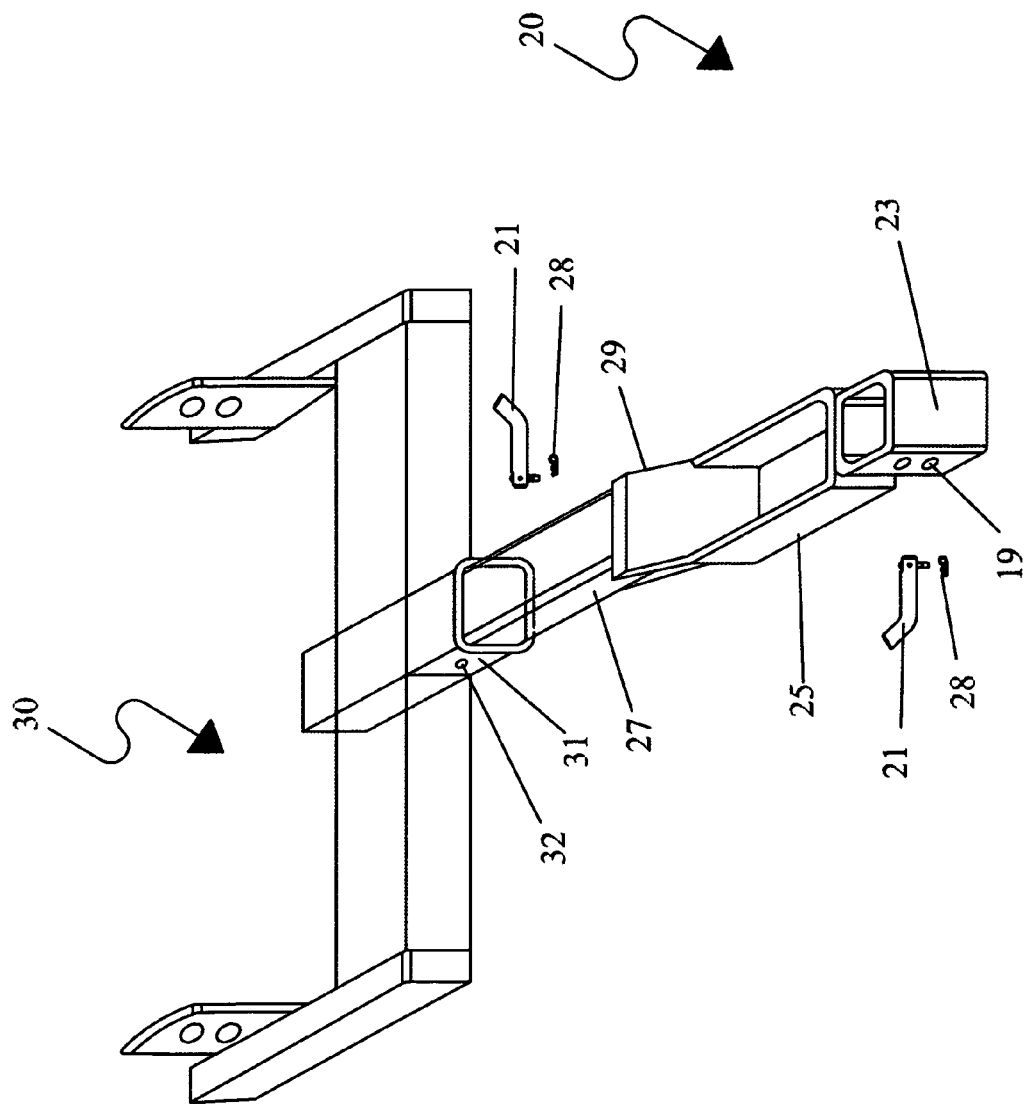

Referring now to FIGS. 2 through 4, a removable, adjustable, and lockable hitch insertion system, comprised of a hitch insert 20 composed of a tubular shank 27 affixed to the boxed body 25 via welded attachment to a 45° angled stiffener piece 29, providing an arch for the steel brace for optimal welding strength. The distal end of the boxed end 25 is mechanically attached to a vertical tubular hitch insert 23 in a similar manner. Adjustment holes 19 located on the hitch insert receiver 23 for vertical and rotational adjustments, and locking pins 21 and retainers 28, are provided with the present invention for insertion 10 into the hitch 11 and shank 12 assemblies and may be inserted at any orientation into the hitch insert receiver 23. The hitch insertion system, in turn, is secured into a hitch receiver bracket 30 through a hitch receiver 31 locked via a locking pin 21 inserted through the locking hole 32 and secured with a locking pin retainer 28. The hitch insert 20 may be rotated 180 degrees for different configurations. As depicted in FIG. 2, the hitch insert 20 is in the "up" position and may be rotated angularly 180 degrees 40 along the horizontal plane. The apparatus 10 also provides means to adjust vertically or rotationally according to diverse trailer tongue heights in a downward position (see FIG. 3b), where the steel shank 22 with pre-drilled adjustment holes 19 are pointed down, or, alternately, in an upward position (see FIG. 3a) where the steel shank 22 with pre-drilled adjustment holes 19 are pointed up. This is achieved by attaching the hitch plate 11 and shank 22 to the hitch insert 20 via securing the shank 22 through the hitch insert receiver 23. The hitch plate 11 and shank 22 is secured into the hitch insert receiver 23 via the locking pin 21 and retainer 28 inserted through the adjustment hole 19. The materials of construction are most commonly those associated with vehicle transportation such as stainless or chromium steel with or without surface protection painting.

The preferred embodiment of the present invention is designed to be used by the common consumer with little or no special skills and minimum experience and training necessary. When the device is first procured it is comprised of two main components, adjustable hitch device 10 and hitch insert 20. The two components are welded as separate parts preventing the use of movable parts subjected to breakdown. The two components are attached together by a single locking pin 21 and retainer 28 providing easy assembly, disassembly, and storage.

The method of utilizing the device may be achieved by performing the following steps: securing the hitch insert 20 into the hitch receiver bracket 30; inserting the hitch plate 11 and shank 22 into the hitch insert 20 via hitch insert receiver 23 in the upwards or downwards position based upon trailer tongue height requirements; and positioning the hitch plate 11 and shank 22 by rotating, vertically lifting, or vertically lowering via the adjustment holes 19 drilled therethrough the shank 11 based upon application preference.

More specifically, the hitch insert 20 fits into a standard two (2) inch hitch receiver 31 mounted on most vehicles capable of pulling. The hitch insert 20 is secured in the upward or downward position for vertical height or vertical drop, depending on trailer tongue height requirements, into the hitch receiver 31 via a locking pin 21 inserted therethrough a locking hole 32. The locking hole 32 is drilled therethrough the tubular shank 27 to correspond with the hitch receiver 31 on vehicles. The hitch plate 11 and shank 22, preferably, is mounted with the first 13, second 24, or third 26 steel ball hitches of diverse spans on either side according to diverse trailer height requirements, and in either a downward or upward position for vertical adjustment. The steel balls 13, 24, and 26 can be placed on the underneath or top surface of the hitch plate 11 or, or in a separate embodiment, they may be placed the first 13 and second 24 steel ball hitches on the top of the hitch plate 11 and the third steel ball hitch 26 under the hitch plate 11. It is anticipated that other embodiments of the orientation of the steel ball hitches 13, 24, and 26 with respect to the hitch plate 11 may be realized during use to correspond with particular applications. The hitch plate 11 and shank 22 comprises of a pulling hook 12 capable of pulling other vehicles or other objects.

For adjustment of a particular application, the hitch plate 11 and shank 22 comprises of two (2) adjustment holes 19 staggered up and down the shank 22 for vertical and rotational adjustments of the hitch plate 11. The adjustment holes 19 drilled therethrough the shank 22 can be aligned variably based upon application with the aligned holes 19 drilled therethrough the hitch insert receiver 23. To adjust rotationally, the locking pin 21 securing the shank 11 and hitch insert receiver 23 can be pulled to allow the shank 22 to be rotated. Every one-quarter turn moves to the second 24 and third 26 size steel ball 13 and the hook 12. Once the apparatus has been aligned, vertically and rotationally, based upon preference on the particular application, the adjustable hitch device 10 and the hitch insert 20 can be attached by inserting the locking pin 21 through the alignment holes 19 located on the shank 22 and the hitch insert receiver 23 and secured with locking pin retainer 28. The alignment holes 19 on the shank 22 and hitch insert receiver 23, and the locking hole 32 on the hitch insert 20 offers the apparatus to comprise of twenty (20) vertical adjustments and four (4) rotational adjustments as separate yet anticipated embodiments of the present invention 10. Yet another embodiment of the present invention in the use of the four-in-one adjustable hitch 10 as a pulling mechanism for not only a variety of trailers, but also for construction and military uses.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An adjustable trailer hitch, comprising:
a hitch insertion assembly having,
a first tubular shank adapted to be secured into a hitch receiver bracket of a towing vehicle,
a boxed body having a proximal end portion and a distal end portion, the proximal end portion coupled to the first tubular shank,
a hitch insert receiver coupled to the distal end portion of the boxed body; and,
a hitch plate and shank arrangement having,
a hitch plate capable of accommodating three differently sized ball hitches and a pulling hook; and,
a second tubular shank extending from the hitch plate, the second tubular shank adapted to be secured through the hitch insert receiver, such that, the hitch plate and shank arrangement is capable of being vertically and rotationally adjusted;
wherein said three differently sized ball hitches and said pulling hook are removably inserted and secured on said hitch plate;
wherein the proximal end portion of the boxed body is welded to the first tubular shank using a 45 degree angled stiffener piece.

2. The adjustable trailer hitch of claim 1, wherein the second tubular shank has a plurality of adjustment holes drilled therethrough, which when aligned variably with a plurality of adjustment holes drilled through the hitch insert receiver, enables a plurality of vertical adjustments for the hitch plate and shank arrangement.

3. The adjustable trailer hitch of claim 2, further comprising:
a locking pin adapted to be inserted through aligned adjustment holes drilled through the second tubular shank and the hitch insert receiver; and,
a locking pin retainer for securing the second tubular shank to the hitch insert receiver.

4. The adjustable trailer hitch of claim 1, wherein the second tubular shank is rotated for rotational adjustments of the hitch plate and shank arrangement.

5. The adjustable trailer hitch of claim 1, wherein the hitch plate is disposed above the hitch insert receiver.

6. The adjustable trailer hitch of claim 1, wherein the hitch plate is disposed below the hitch insert receiver.

7. The adjustable trailer hitch of claim 1, wherein the ball hitches and the pulling hook are mounted at corner portions of the hitch plate;
wherein each of said ball hitches are interchangeably mounted on said hitch plate at any desired corner position except at the corner position on which the pulling hook is mounted.

8. The adjustable trailer hitch of claim 1, wherein at least one ball hitch from said three differently sized ball hitches is mounted on a surface of the hitch plate opposite to a surface from which the second tubular shank is extending.

9. The adjustable trailer hitch of claim 1, wherein at least one ball hitch from said three differently sized ball hitches is mounted on a surface of the hitch plate from which the second tubular shank is extending.

10. The adjustable trailer hitch of claim 1, wherein the first tubular shank is inserted into a hitch receiver of the hitch receiver bracket, and locked therein using a locking pin inserted through aligned locking holes on the hitch receiver and the first tubular shank, and secured using a locking pin retainer.

11. The adjustable trailer hitch of claim 10, wherein the hitch receiver is a 2 inch hitch receiver.

12. The adjustable trailer hitch of claim 1, wherein the hitch insertion assembly is rotated by an angle of about 180 degrees along a horizontal plane for providing a plurality of configurations.

13. An adjustable hitch, comprising:

a hitch insert having,
- a first tubular shank adapted to be secured into a hitch receiver bracket of a towing vehicle,
- a boxed body having a proximal end portion and a distal end portion, the proximal end portion of the boxed body coupled to the first tubular shank, and
- a hitch insert receiver coupled to the distal end portion of the boxed body, the hitch insert receiver oriented perpendicularly to the boxed body;

an adjustable hitch device having,
- a hitch plate capable of accommodating three differently sized ball hitches and a pulling hook, and
- a second tubular shank extending from the hitch plate, the second tubular shank adapted to be secured through the hitch insert receiver;

wherein said three differently sized ball hitches and said pulling hook are removably inserted and secured on said hitch plate;

wherein the second tubular shank has a plurality of adjustment holes drilled therethrough, which when aligned variably with a plurality of adjustment holes drilled through the hitch insert receiver, enables a plurality of vertical adjustments for the adjustable hitch device; and wherein the second tubular shank is capable of being rotated for rotational adjustments of the adjustable hitch device;

wherein the first tubular shank is inserted into a hitch receiver of the hitch receiver bracket, and locked therein using a locking pin inserted through aligned locking holes on the hitch receiver and the first tubular shank, and secured using a locking pin retainer.

14. The adjustable hitch of claim 13, wherein the hitch plate is disposed above the hitch insert receiver.

15. The adjustable hitch of claim 13, wherein the hitch plate is disposed below the hitch insert receiver.

16. The adjustable hitch of claim 13, wherein the hitch receiver is a 2 inch hitch receiver.

\* \* \* \* \*